United States Patent [19]

Pezzoli

[11] 4,234,377

[45] Nov. 18, 1980

[54] ASBESTOS TREATMENT

[75] Inventor: Paul A. Pezzoli, Midland, Mich.

[73] Assignee: The Dow Chemical Company, Midland, Mich.

[21] Appl. No.: 737,888

[22] Filed: Nov. 2, 1976

[51] Int. Cl.$^3$ ............................................ C03B 37/00
[52] U.S. Cl. ...................................... 162/3; 427/215; 427/343; 428/378; 428/443; 424/147
[58] Field of Search ....................... 162/3, 153, 181 A; 427/215, 343; 428/378, 443; 424/131, 144, 132, 147, 145, 2

[56] References Cited

U.S. PATENT DOCUMENTS

| | | | |
|---|---|---|---|
| 1,907,616 | 5/1933 | Tucker | 162/153 |
| 2,096,538 | 10/1937 | Durrant | 427/343 |

OTHER PUBLICATIONS

McNab, G. et al., Nature 214, 522–523 (1967).
Schnitzer et al., "Asbestos Hemolysis", Environ. Res. 3, 1–13 (1970). pp. 1–13.

*Primary Examiner*—William F. Smith
*Attorney, Agent, or Firm*—James M. Kuszaj

[57] ABSTRACT

A method of treating asbestos comprising depositing on at least a portion of the asbestos a material consisting essentially of at least one metal ferrocyanide.

26 Claims, No Drawings

ASBESTOS TREATMENT

BACKGROUND OF THE INVENTION

This invention relates to asbestos. More in particular, the present invention relates to a method of treating asbestos.

"Asbestos" is a general term applied to a group of naturally occurring fibrous silicate minerals that are commercially important because of their fibrous characteristics. Four principal types of asbestos minerals generally enter world commerce. These are chrysotile, crocidolite, amosite and anthophyllite. Of these, chrysotile is perhaps the most important, accounting for about 95 percent of the world's asbestos production.

Chemically, chrysotile asbestos is the fibrous form of the mineral serpentine, a hydrated magnesium silicate having the general formula $Mg_3Si_2O_3(OH)_4$. Structurally the chrysotile asbestos is believed to consist of rolled up sheets formed from two layers. The first layer is a continuous network of silica ($SiO_2$) tetrahedra. This layer is interlocked through common oxygen atoms with a second layer of magnesium hydroxide ($Mg(OH)_2$) octahedra. The walls of the asbestos fibers are composed of a number of such individual sheets contorted into scrolls with the magnesium hydroxide layer on the outside. Consequently, one of the dominant chemical features of chrysotile asbestos is its alkaline surface characteristics.

The surface modification of asbestine minerals, such as chrysotile, has attracted a good deal of attention from research workers during recent years. A large number of surface treatment methods have been proposed and evaluated for the purpose of modifying certain predetermined properties of the asbestos fibers. These procedures include: coating the surface of asbestos fibers with a phosphate, polyphosphate, or corresponding acid to improve the filtration characteristic of the fibers (U.S. Pat. Nos. 3,535,150, 3,957,571); treating asbestos fibers with magnesium carbonate or an oxide of a polyvalent metal to enhance the tensile strength of the fibers (U.S. Pat. Nos. 1,982,542; 2,451,805; 2,460,734); coating an asbestos fabric with an insoluble inorganic oxide to render the fabric flame resistant and water repellent (U.S. Pat. No. 2,406,779); mixing a detergent organic surface-active agent with fibrous asbestos agglomerates to disperse the asbestos fibers (U.S. Pat. No. 2,626,213); and distributing small amounts of polymeric particles or a water-soluble macromolecular organic substance throughout an asbestos product to reduce dust emitted by the asbestos during handling and use (U.S. Pat. Nos. 3,660,148; 3,967,043).

An area of concern to the producers and users of asbestine material has been the potential health problems allegedly associated with asbestos exposure. It has been reported by the National Safety Council that persons who inhale large amounts of asbestos dust can develop disabling or fatal pulmonary and pleural fibrosis (asbestosis) and several types of malignancy of the respiratory tract ("Asbestos", *National Safety Council Newsletter*, R & D Section, June 1974). There is also speculation that asbestos may cause various forms of carcinogenesis, particularly carcinoma of the lung, pleura and peritoneum (R. F. Holt, "Asbestosis", *Nature*, 253, 85 (1975)). Since the pathogenicity of asbestos minerals is apparently unmatched by any other silicate, there has been much interest in developing a method of passivating asbestos to reduce any potential fibrogenic and carcinogenic effects on those exposed to it without adequate precaution.

Existing methodology for studying the in vivo fibrogenic effects of asbestos involves direct inhalation or intratracheal administration of asbestos fibers to animals. Subsequently, the experimentally treated animals are examined, usually months later, for pathological and histochemical evidence of fibrosis. Since the incubation period for asbestos-induced diseases is reported to be unusually long, experiments of this type are complicated, expensive and time consuming.

However, recent work done by R. R. Hefner, Jr. and P. J. Gehring (*American Industrial Hygiene Association Journal*, 36, 734–740 (1975)) shows that a relationship exists between the in vivo fibrogenicity of asbestos and its in vitro hemolytic activity. Hemolytic activity, or hemolysis, is a measure of induced blood cell rupture when fibers are agitated with a suspension of blood erythrocytes. Numerous other authors have also made similar in vitro evaluations of a number of particulates.

The in vitro hemolytic model provides a rapid, relatively inexpensive test which reliably assesses the fibrogenic potential of asbestos. Consequently, the hemolytic model has been employed in the present invention to test the effectiveness of certain asbestos treating procedures found to be potentially useful in alleviating some of the health problems reportedly associated with asbestos fibers.

Various materials have been examined which interact with the surface of asbestos fibers and reduce its hemolytic activity. Such material includes disodium ethylenediamine tetraacetic acid (EDTA), simple phosphates, disodium versenate, polyvinylpyridine N-oxide and aluminum (G. Macnab and J. S. Harington, *Nature* 214, 522-3 (1967), and certain acidic polymers (R. J. Schnitzer and F. L. Pundsack, *Environmental Research* 3, 1–14 (1970). In addition, West German Pat. No. 1,642,022 discloses that asbestos coated with polyvinylpyridine N-oxide minimizes the risk of asbestosis.

Some of these known materials, such as EDTA, are solubilized in body fluids and do not reduce the long term hemolytic activity of the asbestos. There is therefore a need to determine materials which will adhere to the asbestos and reduce its hemolytic activity. Such passivating materials should not adversely affect the useful commercial properties of the asbestos.

SUMMARY OF THE INVENTION

The present invention is a method for treating asbestos comprising depositing on at least a portion of the asbestos a material consisting essentially of at least one metal ferrocyanide.

Using the hemolysis test, as an in vitro screening test to assess the effectiveness of the metal ferrocyanide treatment, it has been surprisingly found that asbestos fibers with at least one metal ferrocyanide deposited thereon have reduced hemolytic activity in comparison with untreated asbestos fibers.

For the purposes of this specification, the oxidation state (valence) of metals which commonly exhibit more than one valence is indicated by a Roman numeral in parentheses following the metal to which it refers.

DESCRIPTION OF THE PREFERRED EMBODIMENT

In accordance with the present invention, asbestos is treated to deposit at least one metal ferrocyanide on at least a portion of the asbestos.

The method of treating asbestos includes depositing an ionizable salt of at least one suitable first metal on at least a portion of the asbestos. In this context an ionizable salt is defined as a salt which dissociates spontaneously into ions of opposite electrical signs when dissolved in a suitable polar solvent, such as water, methanol, mixtures thereof and the like. Examples of suitable first metal cations are barium, cadmium, cobalt, iron (II), iron (III), lead, manganese, nickel, potassium, silver, tin (II), tin (IV), titanium (III) titanium (IV), zinc and mixtures thereof. However other first metal cations which are capable of forming a ferrocyanide salt can also be used.

The ionizable salt can be deposited on the asbestos by contacting asbestos fibers with a solution of the ionizable salt of the first metal, preferably an aqueous solution of the ionizable salt of the first metal, to deposit at least a portion of the ionizable salt on the asbestos. A number of suitable techniques are known for depositing compounds on asbestos. These techniques include spraying the compound onto the asbestos fibers or soaking asbestos fibers in a solution of the coating compound. In the present process, a preferred method of contacting the asbestos with the ionizable salt is by slurrying the asbestos in the solution of the ionizable salt for a sufficient time to allow the surface of the asbestos fibers to be contacted and wetted by the solution.

The ionizable salt employed in the present process is preferably a chloride, a sulfate, a nitrate, or a mixture thereof of the above first metals. More preferably, the ionizable salt is a water soluble chloride salt of the first metal. However, any salt that will ionize in solution to produce a cation of one of the first metals can be used in the present process. Furthermore, the ionizable salt can contain more than one type of cation and one type of anion. For example, a mixture of chloride salts of two first metals, or a mixture of the chloride and sulfate salts of the same first metal is suitable.

The concentration of the solution of the ionizable salt employed in the present process is from about 1 percent by weight of the salt to about the concentration corresponding to a saturated solution of the particular first metal salt. For example, when nickel chloride hexahydrate is the ionizable salt, the concentration of the salt in the aqueous solution at 20° C. and 1 atmosphere pressure is from about 1 to about 72 percent by weight. Preferably, the concentration of the solution of the ionizable salt is from about 5 to about 10 percent by weight.

Advantageously, the mixture of asbestos and the salt solution can be agitated at room temperature for a sufficient time to allow the solution to contact at least a portion, and preferably substantially all of the asbestos fiber surfaces. The agitation of the mixture is accomplished by use of agitation means well-known in the art. These include mechanical, air, hydraulic or magnetic means for inducing agitation.

Following agitation, the asbestos fibers in solution can be separated from the filtrate by any suitable solid-liquid separation technique such as vacuum filtration. The ionizable salt-treated asbestos fibers are then contacted with a solution, preferably an aqueous solution, of a ferrocyanide salt of a second metal. Examples of suitable second metal cations are sodium, potassium or a mixture thereof. Various suitable techniques for contacting the salt-treated asbestos fibers with the ferrocyanide solution can be used as indicated previously. However, it is preferred to slurry the salt-treated asbestos fibers with the ferrocyanide solution. The salt-treated asbestos fibers are maintained in contact with the ferrocyanide solution for a sufficient time to allow at least a portion, and preferably substantially all the ferrocyanide solution to contact the salt-treated asbestos and react with the ionizable salt thereon to form a metal ferrocyanide compound wherein the cation of said compound is originally the cation of the first metal associated with the ionizable salt.

The ferrocyanide solution has a concentration of from about 1 percent by weight to about the concentration corresponding to a saturated solution of the ferrocyanide of the second metal. For example, when sodium ferrocyanide is employed, the concentration of the salt in an aqueous solution at 20° C., 1 atmosphere pressure, is from about 1 to about 32 percent by weight of the ferrocyanide of the second metal. Preferably, the ferrocyanide solution has a concentration of from about 1 to about 10 percent by weight of the second metal ferrocyanide.

The asbestos-ferrocyanide solution slurry is preferably agitated at about room temperature for a sufficient time to insure contact between the asbestos fibers and the solution.

Following agitation, the asbestos fibers in solution are separated from the filtrate by any suitable solid-liquid separation technique, such as vacuum filtration. Preferably the filtered asbestos fibers are subsequently washed with a suitable solvent, such as deionized water, to remove any non-adherent ferrocyanide compound. The asbestos fibers can then be dried by any suitable techniques, such as air drying, heating, vacuum and the like.

The present method of treating asbestos has been described in terms of initially contacting asbestos fibers with a solution of an ionizable salt of at least one first metal and subsequently contacting the thus treated asbestos with a solution of a ferrocyanide salt of at least one second metal to form a coating of a ferrocyanide of at least one first metal. However, the present invention is not limited to this sequence. For example, if desired, the asbestos can initially be contacted with a solution, preferably an aqueous solution, of ferrocyanide of at least one second metal, for example sodium or potassium ferrocyanide. If it is desirable to have another metal ferrocyanide other than the second metal salts deposited on the asbestos, the asbestos can be subsequently contacted with a solution of an ionizable salt of at least one first metal, to deposit on the asbestos a ferrocyanide of at least one of the first metals. Suitable first metals are those that have been described previously.

Alternatively, the metal ferrocyanide can be deposited on the asbestos by directly contacting the surface of the asbestos fibers with at least one first metal ferrocyanide suspended in a liquid medium, such as water. One suitable deposition technique involved suspending a particulate first metal ferrocyanide in water, spraying the suspension onto the surface of the asbestos fibers, and removing the water by drying. First metal ferrocyanides which can be suitably applied in this manner include those that are insoluble in the suspending medium.

The asbestos treated by the present method is characterized as being a fibrous asbestos material consisting essentially of asbestos fibers with a coating of at least one first or second metal ferrocyanide deposited on at least a portion of the asbestos fibers. Suitable first metals include any metal cation capable of forming a ferrocyanide salt. Preferably the first metal cation is barium, cadmium, cobalt, iron (II), iron (III), lead, manganese, nickel, potassium, silver, tin (II), tin (IV), titanium (III), titanium (IV), zinc and mixtures thereof. More preferably, the first metal cation is either titanium (IV), tin (II) or a mixture thereof. Suitable second metal cations are potassium, sodium, or mixtures thereof.

The asbestos treated by the present invention can include chrysotile, crocidolite, amosite, or anthophyllite asbestos. Chrysotile, being the most abundant type of asbestos, is the preferred material for treatment by the present process. The physical form of asbestos treated includes fibrous mineral bundles of fine crystalline fibers, or individual fibers. Preferably the asbestos is in the form of bundles of crystalline fibers. Generally, the individual fibers of the bundle have a fiber length of at least about 0.5 micron, and a diameter of at least about 0.01 micron. However, other fiber lengths and diameters can be employed.

The exact mechanism by which the deposited metal ferrocyanide forms an adherent coating on the asbestos is not completely understood. It is believed that the coating is due to the alkaline outer surface of the asbestos fiber. The individual fibers are composed of a network of magnesium hydroxide tetrahedra. The outermost portion of the tetrahedra contains hydroxyl groups. There is some evidence that hydroxyl hydrogens are being displaced by the metal cation, to form a bond between the metal ferrocyanide and the asbestos. Since each asbestos fiber is composed of a number of individual sheets having outer hydroxyl groups, and because these sheets are contorted into concentric scrolls, the deposition of the metal ferrocyanide may occur on more than just the outermost exposed surface of the asbestos fiber. Some of the metal ferrocyanide can impregnate the interior scrolls of the fiber and deposit on the interior hydroxyl surface present.

The metal ferrocyanide that is deposited on the asbestos is preferably present in an amount of from about 0.05 to about 5.0 percent by weight based on the weight of the asbestos. However, any amount of metal ferrocyanide is beneficial. The metal ferrocyanide deposited on the exposed asbestos surface is from about 0.5 to about 250 angstroms thick. Preferably, the ferrocyanide surface coating is from about 2 to about 50 angstroms thick. As recognized by those skilled in the art, the thickness of the surface coating can vary depending on the nature of the asbestos, its intended end use, and economics.

The following examples further illustrate the present process.

EXAMPLES

A regular grade of Carey 7RF-9 Canadian chrysotile asbestos was used in all of the following examples. The asbestos had a mean fiber length of about 30 microns, and contained about 10-15 percent by weight of impurities. The impurities present were characterized by X-ray diffraction and were found to be about 5 percent by weight $Fe_3O_4$, about 5-10 percent by weight $Mg(OH)_2$ and fractional weight percents of minor impurities generally associated with commercially pure chrysotile asbestos, such as aluminum, chromium, cobalt, scandium and the like.

EXAMPLE 1

Fifteen grams (g) of the asbestos were placed in a 500 milliliters (ml) flask at 20° C. and 1 atmosphere pressure. To this was added 300 ml of an aqueous $NiCl_2.6H_2O$ solution containing 10 percent by weight $NiCl_2.6H_2O$.

The resultant slurry was agitated by use of a magnetic stirring bar to insure uniform dispersion of the $NiCl_2.6H_2O$ throughout the asbestos fibers. Agitation of the slurry in this manner was maintained for 60 minutes at room temperature. The slurry was then filtered by vacuum filtration using Whatman #1 filter paper and a porcelain Buchner funnel.

While still moist, the asbestos fibers were reslurried with 100 ml of an aqueous solution containing 10 percent by weight $K_4[Fe(CN)_6].3H_2O$, together with 500 ml of deionized water in an 800 ml beaker. The resultant slurry was agitated by magnetic stirring for 15 minutes. The slurry was filtered by vacuum filtration using a Whatman #1 filter paper and a porcelain Buchner funnel. The filtered asbestos fibers were washed with 500 ml of deionized water to remove any undeposited salts and allowed to air dry at room temperature for from 12 to 15 hours.

The chrysotile surface coating was characterized by X-ray diffraction and atomic absorption spectroscopy. A coating of $Ni_2Fe(CN)_6$ was shown to be distributed along the surface of the asbestos fibers. Both electron emission spectroscopy and atomic absorption spectroscopy were used to determine the amount of ferrocyanide coating on the fibers. The results verified microscopy data in that about 2 angstroms of the $Ni_2Fe(CN)_6$ were coated on the fibers. High magnification transmission electron microscopy indicated no significant morphological differences between uncoated and coated fibers.

Since chrysotile asbestos is widely used for high temperature insulation, the thermal stability of the coated asbestos was investigated. The differential thermal analysis of coated and uncoated asbestos indicated that there was no appreciable difference in thermal stability due to the coating.

Hemolysis tests of the coated asbestos fibers were conducted in the following manner: Whole rat blood was suspended in 200-300 ml of ISOTON ®, an isotonic blood cell diluent, without an anticoagulant. The whole blood suspension was centrifuged and the red cells were collected and washed in 200-300 ml volume of the pure isotonic diluent. The washing removed plasma which is known to inhibit blood hemolysis from the whole blood suspension. After subsequent centrifugation of the washed cell suspension, a final blood suspension was prepared. This suspension was a 2 percent, by volume, concentration of centrifuged red blood cells in the isotonic diluent.

About 250 milligrams (mg) asbestos fibers were placed in tissue culture flasks and a 25 ml volume of the 2 percent blood suspension was added to each flask. The resultant mixture was agitated by mechanical means and placed in a constant temperature (98.6°±0.5° F.) water bath. The flasks were incubated for 30 minutes in a mechanical shaking incubator at a slow, constant rate of 50 cycles per minute. Control blood suspensions were incubated using the same procedure. Spontaneous hemolysis was determined by incubating the 2 percent blood suspension without asbestos fibers. A 100 percent hemolyzed sample was prepared by adding to the 2 percent blood suspension a small amount (less than one mg) of saponin powder (a known hemolytic agent).

The culture flasks were removed from the incubator after 30 minutes and the contents of each flask were centrifuged. A 3 ml volume of the resultant supernatant liquid was withdrawn and diluted with deionized water to a volume of 100 ml. The absorbance of the diluted samples was measured at 415 nanometer (nm) using a double-beam spectrophotometer. The diluted spontaneous hemolysis liquid was used as the reference solution in all absorbance measurements. Percent hemolysis was defined as $$\% \text{ Hemolysis} = \frac{A_H}{A_{100}} \times \frac{100}{100}$$

where $A_H$ was the absorbance of a sample with asbestos fibers and $A_{100}$ was the absorbance of the 100% hemolyzed sample.

The dramatic reduction of hemolytic activity induced by the deposited nickel ferrocyanide is shown in Table I.

EXAMPLES 2–14

Examples 2–14 were prepared in substantially the same manner as described in Example 1, except that the chloride salt of different metals was used in the initial contacting step. The reduction of hemolytic activity induced by the deposited metal ferrocyanides is shown in Table I.

COMPARATIVE EXAMPLE A

Uncoated chrysotile asbestos was tested for hemolytic activity. The results are shown in Table I.

TABLE I

Hemolysis Induced by Ferrocyanide Coating on Chrysotile Asbestos

| Example | Coating | % Hemolysis |
|---|---|---|
| 1 | $Ni_2Fe(CN)_6$ | 1 |
| 2 | $Cd_2Fe(CN)_6$ | 0 |
| 3 | $Mn_2Fe(CN)_6$ | 1 |
| 4 | $Co_2Fe(CN)_6$ | 4 |
| 5 | $Sn_2Fe(CN)_6$ | 5 |
| 6 | $TiFe(CN)_6$ | 7 |
| 7 | $Pb_2Fe(CN)_6$ | 8 |
| 8 | $Fe_4[Fe(CN)_6]_3$ | 9 |
| 9 | $Ba_2Fe(CN)_6$ | 10 |
| 10 | $K_4Fe(CN)_6$ | 12 |
| 11 | $Fe_2Fe(CN)_6$ | 26 |
| 12 | $Zn_2Fe(CN)_6$ | 42 |
| 13 | $Ag_4Fe(CN)_6$ | 44 |
| 14 | $SnFe(CN)_6$ | 55 |
| A (Comparative) | None | 70 |

The durability of the coatings of Examples 1, 2, 5, 6, 8 and A was determined by a series of attrition tests. The first-stage tests consisted of washing the coated asbestos fibers sequentially with (1) water, (2) an aqueous solution of 0.1 normal (N) HCl, (3) an aqueous solution of 0.1 N NaOH, and (4) acetone. Treated fibers were also tested for durability by heat treatment for 3 hours and by grinding in a mechanical blender. After each of the six tests, the coated fibers were reevaluated using the hemolysis test. The results of first-stage attrition test are outlined in Table II. The durability of a coating in a test was indicated by the difference in the hemolysis value before and after attrition. An increase in the percent hemolysis, indicated that the coating was being removed by that test.

When the uncoated chrysotile was heated to 150° C. for three hours the hemolytic activity of the fibers was reduced from 70 percent to 12 percent as shown in Table II. The reduction in hemolytic activity of the uncoated asbestos as a function of temperature and time was studied. The results indicated that no passivation of the fibers occurred through heat treatment; instead, reversible dehydration of the fibers was observed.

TABLE II

First-Stage Attrition Tests with Coated Chrysotile Asbestos
% Hemolysis

| Example | Coating | Initial | $H_2O$ Wash | 0.1 N HCl Wash | 0.1 N NaOH Wash | Acetone Wash | Heated to 150° C./3 Hr | Ground |
|---|---|---|---|---|---|---|---|---|
| 1 | $Ni_2Fe(CN)_6$ | 1 | 0 | 23 | 3 | 1 | 42 | 1 |
| 2 | $Cd_2Fe(CN)_6$ | 0 | 2 | 27 | 5 | 2 | 1 | 0 |
| 5 | $Sn_2Fe(CN)_6$ | 5 | 4 | 5 | 8 | 4 | 9 | 4 |
| 6 | $TiFe(CN)_6$ | 7 | 3 | 4 | 3 | 6 | 11 | 4 |
| 8 | $Fe_4[Fe(CN)_6]_3$ | 9 | 7 | 16 | 22 | 18 | 21 | 13 |
| A | None | 70 | 77 | 40 | 75 | 78 | 12 | 78 |

Coatings which continued to show low hemolytic activity after subjection to first-stage attrition test were tested in second-stage attrition tests. These tests included slurrying the coated fibers in deionized water for a period of up to 3 months and continuously washing the fibers with water for up to 1 month. The hemolytic activity of the fibers was measured periodically and the results are shown in Table III.

TABLE III

Second-Stage Attrition Test with Coated Chrysotile Asbestos

| Example | Coating | Attrition Test | Time Weeks | % Hemolysis |
|---|---|---|---|---|
| 1 | $Ni_2Fe(CN)_6$ | Continuous Water Wash (90° C.) | 0 | 2 |
| | | | 1 | 39 |
| | | Water Slurry (25° C.) | 0 | 2 |
| | | | 4 | 2 |
| | | | 12 | 1 |
| 2 | $Cd_2Fe(CN)_6$ | Continuous Water Wash (20° C.) | 0 | 0 |
| | | | 1 | 9 |
| | | | 2 | 24 |
| | | Water Slurry (25° C.) | 0 | 0 |
| | | | 8 | 0 |
| | | | 12 | 2 |
| 5 | $Sn_2Fe(CN)_6$ | Continuous Water Wash (90° C.) | 0 | 1 |
| | | | 3 | 6 |
| | | | 4 | 6 |
| | | Water Slurry (25° C.) | 0 | 1 |
| | | | 4 | 1 |
| | | | 12 | 1 |
| 6 | $TiFe(CN)_6$ | Continuous Water Wash (90° C.) | 0 | 2 |
| | | | 1 | 34 |
| | | | 2 | 45 |
| | | Water Slurry (25° C.) | 0 | 2 |
| | | | 8 | 2 |
| | | | 12 | 2 |

Further attrition tests were conducted on Examples 5 and 6 by immersing the coated fibers in sterile calf serum (Grand Island Biological Co) and incubating the serum at body temperature (37° C.) for 6 months. Analysis of the serum at various time intervals as shown in Table IV demonstrated that generally less than 1 percent of the metal in the compound initially deposited on the fibers could be detected in the serum and that the coating on the fibers remains substantially intact when subjected to a body fluid at body temperature for an extended time period.

TABLE IV

Serum Attrition Test of Coated Chrysotile Asbestos

| Example | Coating | Time/Wk | % Metal Removed |
|---|---|---|---|
| 5 | $Sn_2Fe(CN)_6$ | 2 | 0.0 ± 0.1 |
|   | (1.70 mg Sn/g asbestos) | 4 | 0.3 ± 0.1 |
|   |   | 6 | 0.4 ± 0.1 |
|   |   | 14 | 0.5 ± 0.1 |
|   |   | 19 | 0.6 ± 0.1 |
|   |   | 24 | 1.0 ± 0.1 |
| 6 | $TiFe(CN)_6$ | 2 | 0.0 ± 0.2 |
|   | (0.66 mg Ti/g asbestos) | 4 | 0.0 ± 0.2 |
|   |   | 8 | 0.0 ± 0.2 |
|   |   | 11 | 0.0 ± 0.2 |
|   |   | 16 | 0.0 ± 0.2 |
|   |   | 24 | 0.0 ± 0.2 |

The surface area of the coated chrysolite asbestos was measured by a method based on the BET (Brunauer, Emmett, Teller) adsorption isotherm. Uncoated chrysotile asbestos (Example A) had a surface area of 26.7 square meter per gram ($m^2/g$). Examples 5 and 6 showed decreased surface area of 11.8 and 15.7 $m^2/g$ respectively.

The results presented in Tables I–IV clearly indicate the significant reduction in hemolysis achieved by the present process. Untreated asbestos ruptured about 70% of the available red cells in a blood suspension while the various ferrocyanide coated fibers induced from 0 to 55% hemolysis. Furthermore, the coatings on the chrysotile asbestos have been demonstrated to be extremely durable when subject to a rigorous series of chemical and physical tests.

What is claimed is:

1. A method of treating asbestos comprising depositing on at least a portion of the asbestos a sufficient amount of a material consisting essentially of at least one metal ferrocyanide to reduce the hemolytic activity of the asbestos to at least about 9 percent hemolysis.

2. The method of claim 1 wherein the asbestos is chrysotile.

3. The method of claim 1 wherein the metal is selected from the group consisting of cadmium, iron (III), nickel, tin (II), and titanium (IV).

4. The method of claim 1 wherein the metal is titanium (IV).

5. The method of claim 1 wherein the metal is tin (II).

6. The method of claim 1 wherein the depositing step comprises:
   (a) contacting the asbestos with a solution of an ionizable salt of at least a first metal to deposit at least a portion of the ionizable salt on the asbestos;
   (b) contacting the asbestos with a solution solution of a ferrocyanide salt of a second metal to form a ferrocyanide of at least the first metal on at least a portion of the surface of the asbestos.

7. The method of claim 6 wherein the first metal is selected from the group consisting of cadmium, iron (III), nickel, tin (II), and titanium (IV).

8. The method of claim 6 wherein the second metal is selected from the group consisting of sodium and potassium.

9. The method of claim 6 wherein the solution of the ionizable salt has a salt concentration of from about 1 percent by weight to about a concentration corresponding to a saturated solution of the salt.

10. The method of claim 6 wherein the solution of the ionizable salt has a salt concentration of from about 5 percent by weight to about 10 percent by weight of the salt.

11. The method of claim 6 wherein the ionizable salt includes at least one member selected from the group consisting of a chloride, a sulfate, and a nitrate.

12. The method of claim 6 wherein the ionizable salt is a chloride.

13. The method of claim 6 wherein the solution of the ferrocyanide salt has a concentration of from about 1 percent by weight to about the concentration corresponding to a saturated solution of the ferrocyanide of the second metal.

14. The method of claim 6 wherein the solution of the ferrocyanide salt has a concentration of from about 1 percent by weight to about 10 percent by weight of the ferrocyanide of the second metal.

15. The method of claim 6 wherein the solution of the ionizable salt is an aqueous solution.

16. The method of claim 6 wherein the solution of the ferrocyanide salt is an aqueous solution.

17. The method of claim 1 wherein the depositing step comprises spraying at least a portion of the asbestos with at least one metal ferrocyanide suspended in a liquid medium.

18. The method of claim 17 wherein the medium is water.

19. A method for treating asbestos comprising:
   (a) slurrying the asbestos with a sufficient amount of an aqueous solution of an ionizable salt of at least a first metal selected from the group consisting of cadmium, iron (III), nickel, tin (II), and titanium (IV), to deposit at least a portion of the ionizable salt of the first metal on at least a portion of the asbestos;
   (b) slurrying the asbestos from step (a) with an aqueous solution of a ferrocyanide of a second metal selected from the group consisting of sodium and potassium to form a sufficient amount of a ferrocyanide of the first metal on at least a portion of the asbestos wherein the ionizable salt was deposited to reduce the hemolytic activity of the asbestos to at least about 9 percent hemolysis.

20. The method of claim 19 including agitating the asbestos and the aqueous solution of the ionizable salt of the first metal for a sufficient time to allow the ionizable salt to contact at least a portion of the asbestos.

21. A fibrous asbestos material consisting essentially of asbestos fibers and at least one metal ferrocyanide deposited on at least a portion of the asbestos fibers in a sufficient amount to reduce the hemolytic activity of the asbestos fibers to at least about 9 percent hemolysis.

22. The material of claim 21 wherein the metal is selected from the group consisting of cadmium, iron (III), nickel, tin (II), and titanium (IV).

23. The material of claim 21 wherein the metal is titanium (IV).

24. The material of claim 21 wherein the metal is tin (II).

25. The material of claim 21 wherein the metal ferrocyanide is present in an amount of from about 0.05 to about 5.0 percent by weight, based on the weight of the asbestos.

26. The material of claim 21 wherein the asbestos has a fiber length of at least about 0.5 microns.

* * * * *